(12) United States Patent
Feng et al.

(10) Patent No.: US 10,491,809 B2
(45) Date of Patent: *Nov. 26, 2019

(54) OPTIMAL VIEW SELECTION METHOD IN A VIDEO CONFERENCE

(71) Applicant: Polycom, Inc., San Jose, CA (US)

(72) Inventors: Jinwei Feng, Woburn, MA (US); Peter Chu, Lexington, MA (US)

(73) Assignee: Polycom, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/143,268

(22) Filed: Sep. 26, 2018

(65) Prior Publication Data
US 2019/0158733 A1 May 23, 2019

Related U.S. Application Data

(63) Continuation of application No. 15/640,358, filed on Jun. 30, 2017, now Pat. No. 10,091,412.

(51) Int. Cl.
H04N 5/232 (2006.01)
H04N 7/15 (2006.01)
H04N 7/14 (2006.01)
H04M 3/56 (2006.01)

(52) U.S. Cl.
CPC ..... *H04N 5/23219* (2013.01); *H04N 5/23206* (2013.01); *H04N 5/23296* (2013.01); *H04N 5/23299* (2018.08); *H04N 7/147* (2013.01); *H04N 7/15* (2013.01); *H04M 3/567* (2013.01); *H04M 2201/50* (2013.01); *H04M 2203/509* (2013.01); *H04N 5/232* (2013.01); *H04N 7/142* (2013.01)

(58) Field of Classification Search
CPC combination set(s) only.
See application file for complete search history.

(56) References Cited

U.S. PATENT DOCUMENTS

| 6,795,106 | B1* | 9/2004 | Cooper | H04N 7/147 348/14.07 |
| 7,081,915 | B1* | 7/2006 | Hamilton | H04N 7/142 348/14.08 |
| 7,117,157 | B1 | 10/2006 | Taylor et al. | |
| 9,030,520 | B2 | 5/2015 | Chu et al. | |
| 9,195,880 | B1 | 11/2015 | Levoy et al. | |
| 2007/0140555 | A1* | 6/2007 | Iguchi | G06T 11/60 382/167 |
| 2011/0285807 | A1 | 11/2011 | Feng | |
| 2011/0285808 | A1 | 11/2011 | Feng et al. | |

(Continued)

OTHER PUBLICATIONS

EPO Search Report received in copending EP Application No. 18177138 dated Nov. 12, 2018, 7 pages.

*Primary Examiner* — Phung-Hoang J Nguyen
(74) *Attorney, Agent, or Firm* — Blank Rome, LLP

(57) ABSTRACT

A system for ensuring that the best available view of a person's face is included in a video stream when the person's face is being captured by multiple cameras at multiple angles at a first endpoint. The system uses one or more microphone arrays to capture direct-reverberant ratio information corresponding to the views, and determines which view most closely matches a view of the person looking directly at the camera, thereby improving the experience for viewers at a second endpoint.

20 Claims, 10 Drawing Sheets

(56) References Cited

U.S. PATENT DOCUMENTS

| | | | |
|---|---|---|---|
| 2011/0285809 A1 | 11/2011 | Feng et al. | |
| 2012/0007890 A1* | 1/2012 | Choi | G06T 11/60 |
| | | | 345/635 |
| 2012/0050523 A1* | 3/2012 | Cook | H04N 7/188 |
| | | | 348/92 |
| 2013/0033596 A1* | 2/2013 | Crothers | G01B 21/045 |
| | | | 348/135 |

* cited by examiner

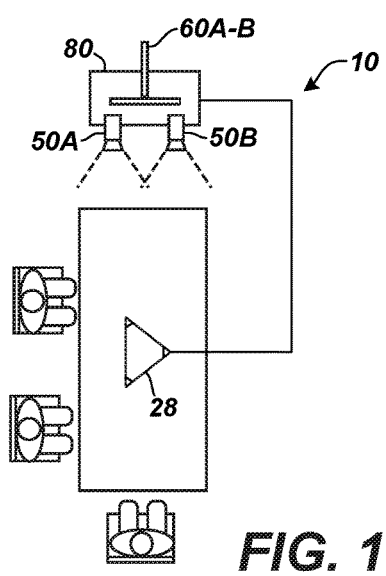
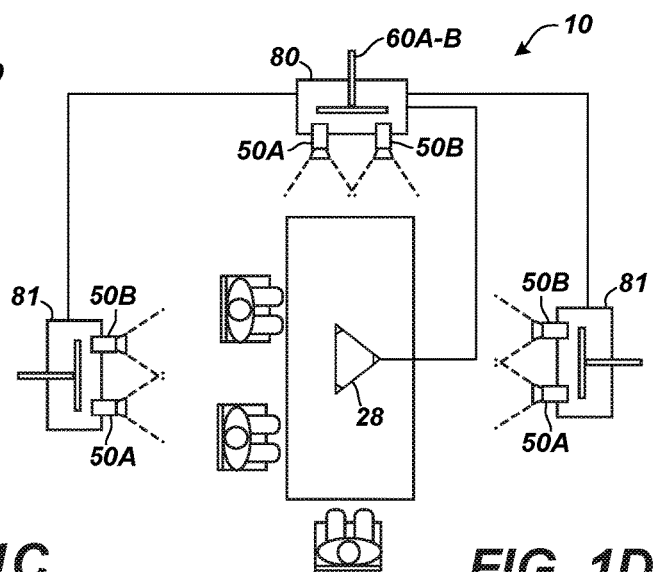
FIG. 1C    FIG. 1D
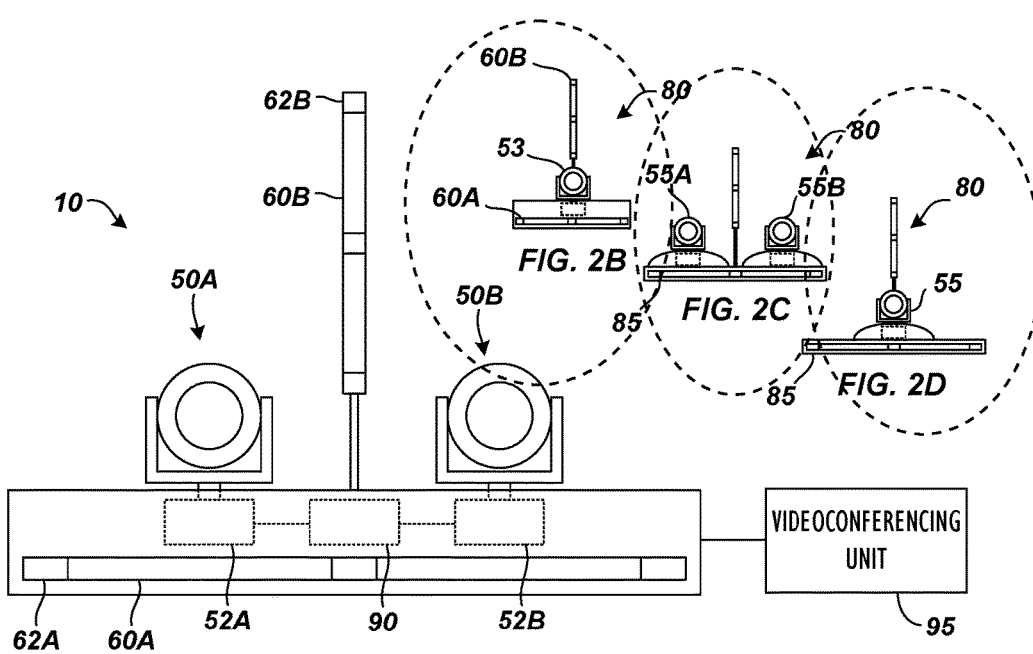
FIG. 2A

FIG. 7A
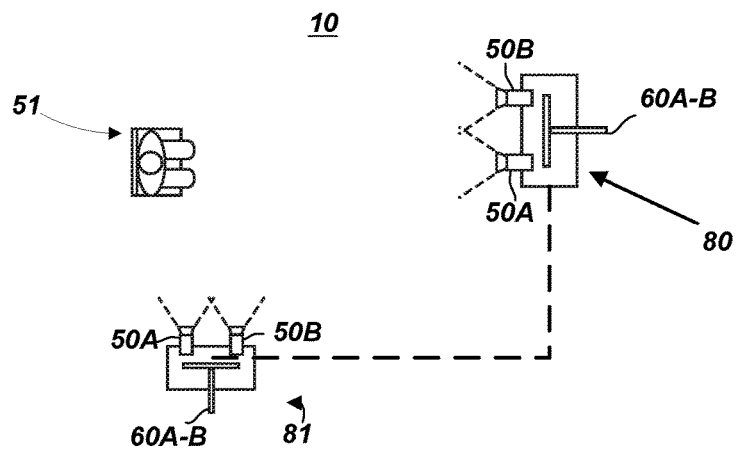
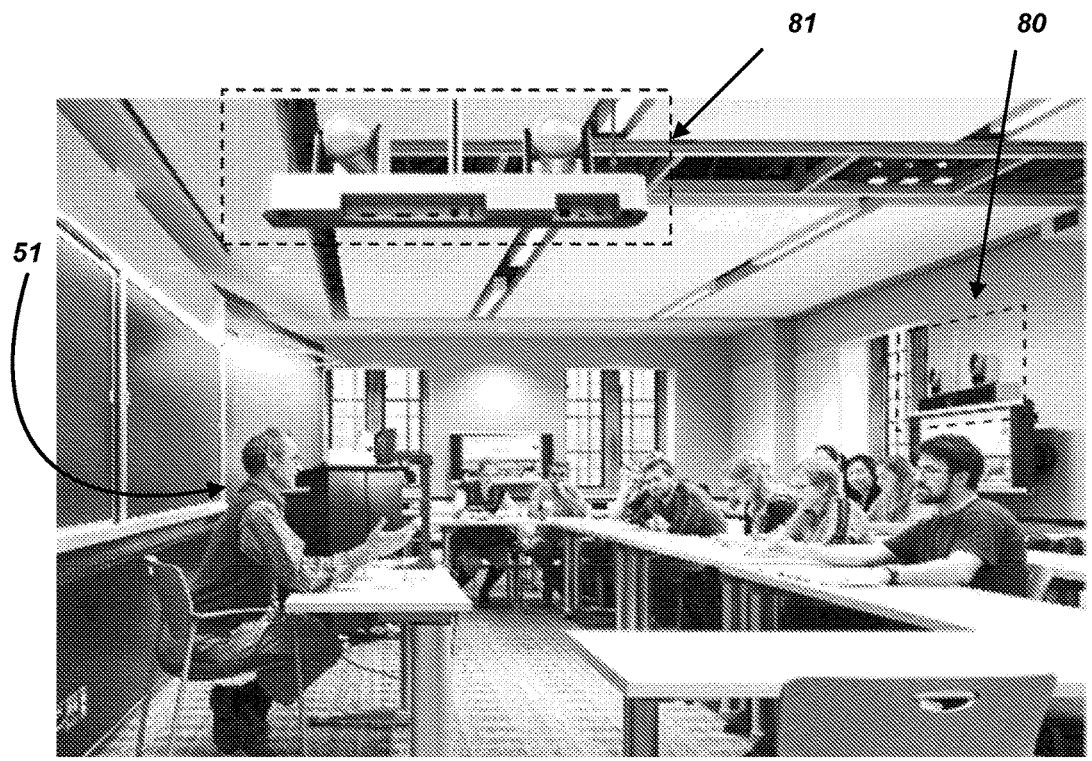
FIG. 7B

View 1    View 2

View 1 SOIC > View 2 SOIC ⟶ Select View 1

FIG. 9A
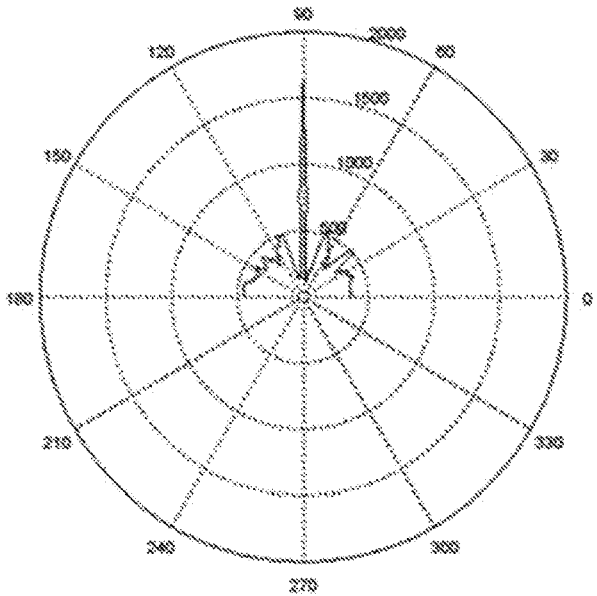
Steered Response Power from Mic Array when talker facing the microphone array
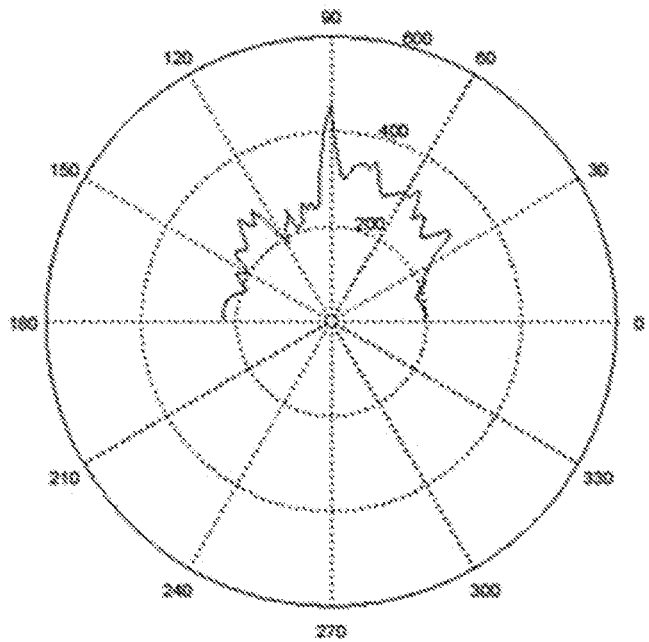
Steered Response Power from Mic Array when talker turning back to the microphone array
FIG. 9B

OPTIMAL VIEW SELECTION METHOD IN A VIDEO CONFERENCE

CROSS-REFERENCE TO RELATED APPLICATION

This application is a continuation of U.S. application Ser. No. 15/640,358, entitled 'Optimal View Selection Method in a Video Conference,' and is related to U.S. application Ser. No. 15/640,385, filed Jun. 30, 2017, and entitled 'Interference-Free Audio Pickup in a Video Conference,' the contents of which applications are entirely incorporated herein.

TECHNICAL FIELD

This disclosure is generally concerned video conferencing, and more specifically with methods and equipment for selecting an optimal view of a region of interest from amongst a plurality of views.

BACKGROUND

The cameras for a videoconferencing system often has mechanical pan, tilt, and zoom control. Ideally, these controls should be continuously adjusted to achieve optimal video framing of the people in the room based on where they are seated and who is talking. Unfortunately, due to the difficulty of performing these adjustments, the camera may often be set to a fixed, wide-angle view of the entire room and may not be adjusted. If this is the case, far-end participants may lose much of the value from the video captured by the camera because the size of the near-end participants displayed at the far-end may be too small. In some cases, the far-end participants cannot see the facial expressions of the near-end participants, and may have difficulty identifying speakers. These problems give the videoconference an awkward feel and make it hard for the participants to have a productive meeting.

To deal with poor framing, participants may have to intervene and perform a series of manual operations to pan, tilt, and zoom the camera to capture a better view. As expected, manually directing the camera can be cumbersome even when a remote control is used. Sometimes, participants do not bother adjusting the camera's view and simply use the default wide view. Of course, when a participant does manually frame the camera's view, the procedure has to be repeated if participants change positions during the videoconference or use a different seating arrangement in a subsequent videoconference.

An alternative to manual intervention is to use voice-tracking technology. Voice-tracking cameras having microphone arrays can help direct the cameras during the videoconference toward participants who are speaking. Although the voice-tracking camera is usually very accurate in it can still encounter some problems. When a speaker turns away from the microphones, for example, the voice-tracking camera may lose track of the speaker. Additionally, a very reverberant environment can cause the voice-tracking camera to direct at a reflection point rather than at an actual sound source of a person speaking. For example, typical reflections can be produced when the speaker turns away from the camera or when the speaker sits at an end of a table. If the reflections are troublesome enough, the voice-tracking camera may be guided to point to a wall, a table, or other surface instead of the actual speaker.

An excellent earlier solution to these issues is set forth in U.S. Pat. No. 8,842,161 to Jinwei Feng et al. That patent discloses a videoconference apparatus and method which coordinates a stationary view obtained with a stationary camera to an adjustable view obtained with an adjustable camera. The stationary camera can be a web camera, while the adjustable camera can be a pan-tilt-zoom camera. As the stationary camera obtains video, faces of participants are detected, and a boundary in the view is determined to contain the detected faces. Absence and presence of motion associated with the detected face is used to verify whether a face is reliable. In Jinwei, in order to capture and output video of the participants for the videoconference, the view of the adjustable camera is adjusted to a framed view based on the determined boundary. U.S. Pat. No. 8,842,161 combined the technology of sound source location (SSL), participant detection and motion detection to locate the meeting attendees and decide what the optimal view would be, based on the location information, and then control the adjunct pan-tilt-zoom (PTZ) camera to pan, tilt and zoom to get the desired view.

Due to the popularity of the videoconference apparatuses such as those disclosed in U.S. Pat. No. 8,842,161, it has become popular to extend the range of such apparatuses by connecting two such devices, with one controlling the other. This has meant that oftentimes two views of a meeting presenter will be captured, one by each of the adjustable cameras. The issue then becomes, how to ensure that the better view is selected for transmission to a remote endpoint.

SUMMARY

Embodiments of this disclosure pertain to one or more cameras which are automatically adjusted to continuously and instantly provide an optimal view of all persons attending a video conference using auto-framing. Embodiments of this disclosure pertain to automatically adjusting one or more cameras continuously to provide an optimal view of a person who is speaking. Embodiments of this disclosure pertain to control of cameras producing view feeds of the same person from different angles, and to controlling switching operations between one pickup feed and another, with one goal being to utilize that feed which has the best front face view of a person who is speaking.

BRIEF DESCRIPTION OF THE DRAWINGS

For the purpose of illustration, there are shown in the drawings certain embodiments described in the present disclosure. In the drawings, like numerals indicate like elements throughout. It should be understood that the full scope of the inventions disclosed herein are not limited to the precise arrangements, dimensions, and instruments shown. In the drawings:

FIGS. 1C-1D show plan views of videoconferencing endpoints.

FIG. 2A shows a videoconferencing device for an endpoint according to the present disclosure.

FIGS. 2B-2D show alternate configurations for the videoconferencing device.

FIGS. 7A-7B illustrate another endpoint configuration in accordance with this disclosure.

FIGS. 9A-9B illustrate example beamforming plots in accordance with an embodiment of this disclosure.

DETAILED DESCRIPTION

Figure 1A:
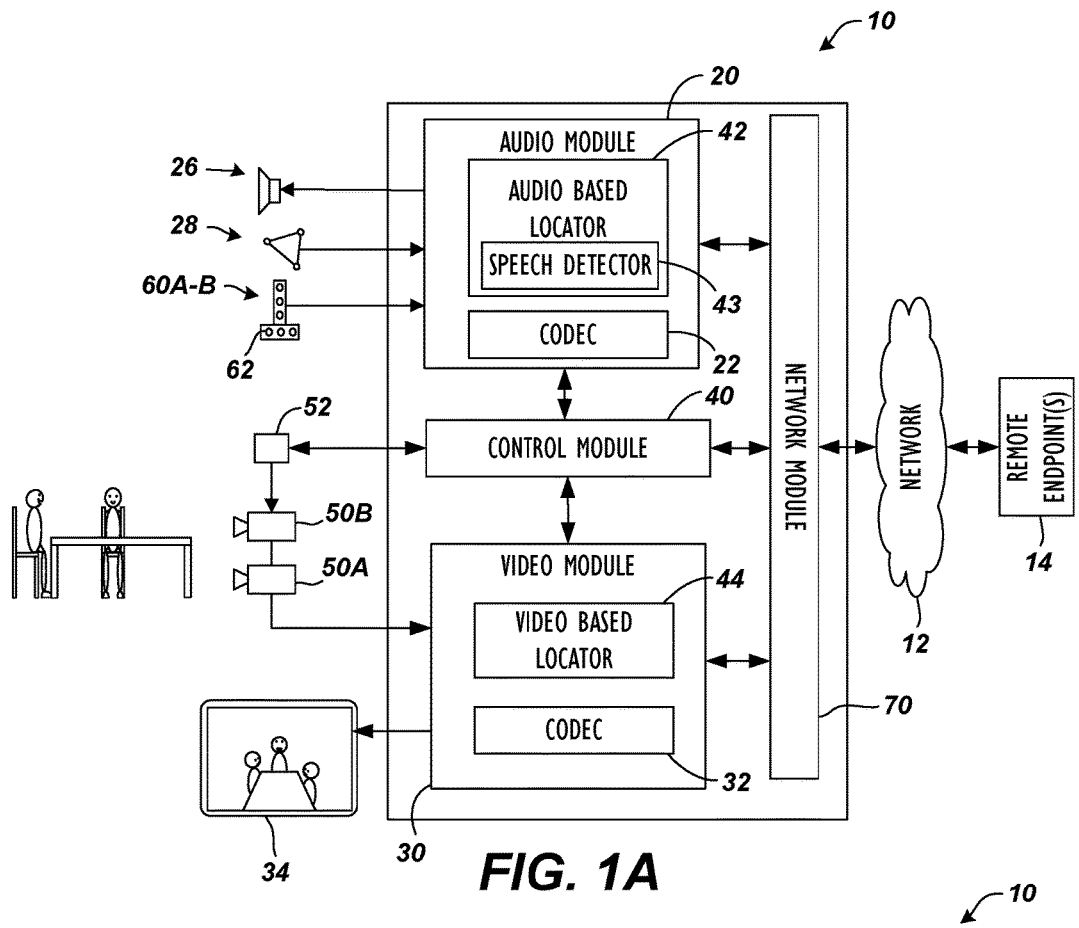
FIG. 1A illustrates a videoconferencing endpoint according to certain teachings of the present disclosure.

Reference will now be made in detail to implementations of the technology. Each example is provided by way of explanation of the technology only, not as a limitation of the technology. It will be apparent to those skilled in the art that various modifications and variations can be made in the present technology. For instance, features described as part of one implementation of the technology can be used on another implementation to yield a still further implementation. Thus, it is intended that the present encompass such modifications and variations.

Descriptions of terms used within this disclosure are provided as follows. 'Coupled' refers to components or devices which able interact with one another, either directly or indirectly. All connected elements are coupled, but not all coupled elements are connected. Coupled elements include those which are in communication with each other. 'Proximity' refers to the degree to which items or elements or components etc. are close to one another. Elements are 'proximate' when they are near each other, as would be understood by a person of skill based on the context.

This disclosure pertains to a video conferencing endpoint having one or more stationary cameras and a plurality of adjustable cameras. At least one embodiment, an endpoint can include multiple video conferencing devices, each of which comprises a stationary camera and an adjustable camera. It can be desirable to couple two or more such devices together, in order to provide more range or distance for audio-visual pickup than would be possible with only one such device. When such devices are coupled, they are said to be "daisy-chained." For clarity of explanation herein, scenarios in which two such devices are daisy-chained are discussed, though more than two such devices (and configurations) are possible without departing from this disclosure. Thus, in some of the examples discussed, there is one master device and one slave device, the latter being controlled by the master device. However, multiple slave devices are possible.

With the added power that comes from having multiple adjustable (and/or tracking) cameras comes also some new problems. Consider for example the situation in which a presenter is speaking and he is being tracked by two cameras; each of these cameras will capture an image of the speaker. One of the two cameras will provide an image that is superior to the other. While there are various factors that could make one view better than another, such as size, image quality, accuracy in voice to video synchronization, the property with which this disclosure is primarily is concerned is which view more closely approximates a view in which the speaker is perceived as looking into or at the camera in question. By selecting the superior view for inclusion in the audio-video transmission to a far endpoint, the visual experience—and hence the learning experience—of those at the receiving endpoint will be improved. Thus, embodiments of this disclosure are directed toward determining which device (or camera) among the daisy-chained units provides the best zoomed-in, frontal view of the talker 51 as the system output.

In accordance with at least one embodiment, a videoconferencing apparatus or endpoint 10 in FIG. 1A communicates with one or more remote endpoints 14 over a network 12. Among some common components, the endpoint 10 has an audio module 20 with an audio codec 22 and has a video module 30 with a video codec 32. These modules 20/30 operatively couple to a control module 40 and a network module 60.

During a videoconference, two or more cameras 50A-B capture video and provide the captured video to the video module 30 and codec 32 for processing. Additionally, one or more microphones 28 capture audio and provide the audio to the audio module 20 and codec 22 for processing. These microphones 28 can be table or ceiling microphones, or they can be part of a microphone pod or the like. The endpoint 10 uses the audio captured with these microphones 28 primarily for the conference audio.

Separately, microphone arrays 60A-B having orthogonally arranged microphones 62 also capture audio and provide the audio to the audio module 22 for processing. Preferably, the microphone arrays 60A-B include both vertically and horizontally arranged microphones 62 for determining locations of audio sources during the videoconference. Therefore, the endpoint 10 uses the audio from these arrays 60A-B primarily for camera tracking purposes and not for conference audio, although their audio could be used for the conference.

After capturing audio and video, the endpoint 10 encodes it using any of the common encoding standards, such as MPEG-1, MPEG-2, MPEG-4, H.261, H.263 and H.264. Then, the network module 70 outputs the encoded audio and video to the remote endpoints 14 via the network 12 using any appropriate protocol. Similarly, the network module 70 receives conference audio and video via the network 12 from the remote endpoints 14 and sends these to their respective codec 22/32 for processing. Eventually, a loudspeaker 26 outputs conference audio, and a display 34 outputs conference video. Many of these modules and other components can operate in a conventional manner well known in the art so that further details are not provided here.

In contrast to a conventional arrangement, the endpoint 10 uses the two or more cameras 50A-B in an automated and coordinated manner to handle video and views of the videoconference environment dynamically. A first camera 50A can be a fixed or room-view camera, and a second camera 50B can be a controlled or people-view camera. Using the room-view camera 50A, for example, the endpoint 10 captures video of the room or at least a wide or zoomed-out view of the room that would typically include all the videoconference participants as well as some of the surroundings. Although described as fixed, the room-view camera 50A can actually be adjusted by panning, tilting, and zooming to control its view and frame the environment.

By contrast, the endpoint 10 uses the people-view camera 50B to capture video of one or more particular participants, and preferably one or more current speakers, in a tight or zoomed-in view. Therefore, the people-view camera 50B is particularly capable of panning, tilting, and zooming.

In one arrangement, the people-view camera 50B is a steerable Pan-Tilt-Zoom (PTZ) camera, while the room-view camera 50A is an Electronic Pan-Tilt-Zoom (EPTZ) camera. As such, the people-view camera 50B can be steered, while the room-view camera 50A can be operated electronically to alter its viewing orientation rather than being steerable. However, the endpoint 10 can use other arrangements and types of cameras. In fact, both cameras 50A-B can be steerable PTZ cameras. Moreover, switching between wide and zoomed views can be shared and alternated between the two steerable cameras 50A-B so that one captures wide views when appropriate while the other captures zoomed-in views and vice-versa.

For the purposes of the present disclosure, one camera 50A is referred to as a room-view camera, while the other camera 50B is referred to as a people-view camera. Although it may be desirable to alternate between tight views of a speaker and wide views of a room, there may be situations where the endpoint 10 can alternate between two different tight views of the same or different speaker. To do this, it may be desirable to have the two cameras 50A-B both be steerable PTZ cameras as noted previously. In another arrangement, therefore, both the first and second cameras 50A-B can be a controlled or people-view camera, such as steerable PTZ cameras. The endpoint 10 can use each of these cameras 50A-B to capture video of one or more particular participants, and preferably one or more current speakers, in a tight or zoomed-in view as well as providing a wide or zoomed-out view of the room when needed.

In one implementation, the endpoint 10 outputs only video from one of the two cameras 50A-B at any specific time. As the videoconference proceeds, the output video from the endpoint 10 can then switch between the room-view and people-view cameras 50A-B from time to time. In general, the system 10 outputs the video from room-view camera 50A when there is no participant speaking (or operation has degraded), and the endpoint 10 outputs the video from people-view camera 50B when one or more participants are speaking. In one implementation, switching between these camera views allows the far-end of the videoconference to appreciate the zoomed-in views of active speakers while still getting a wide view of the meeting room from time to time.

As an alternative, the endpoint 10 can transmit video from both cameras simultaneously, and the endpoint 10 can let the remote endpoint 76 decide which view to show, especially if the endpoint 10 sends some instructions for selecting one or the other camera view. In yet another alternative, the endpoint 10 can transmit video from both cameras simultaneously so one of the video images can be composited as a picture-in-picture of the other video image. For example, the people-view video from camera 50B can be composited with the room-view from camera 50A to be sent to the far end in a picture-in-picture (PIP) format.

To control the views captured by the two cameras 50A-B, the endpoint 10 uses an audio based locator 42 and a video-based locator 44 to determine locations of participants and frame views of the environment and participants. Then, the control module 40 operatively coupled to the audio and video modules 20/30 uses audio and/or video information from these locators 42/44 to send camera commands to one or both of the cameras 50A-B to alter their orientations and the views they capture. For the people-view camera 50B, these camera commands can be implemented by an actuator or local control unit 52 having motors, servos, and the like that steer the camera 50B mechanically. For the room-view camera 50B, these camera commands can be implemented as electronic signals to be handled by the camera 50B.

To determine which camera 50A-B to use and how to configure its view, the control module 40 uses audio information obtained from the audio-based locator 42 and/or video information obtained from the video-based locator 44. For example, and as described in more detail below, the control module 40 uses audio information processed by the audio based locator 42 from the horizontally and vertically arranged microphone arrays 24. The audio based locator 42 uses a speech detector 43 to detect speech in captured audio from the arrays 24 and then determines a location of a current speaker. The control module 40 using the determined location to then steer the people-view camera 50B toward that location. As also described in more detail below, the control module 40 uses video information processed by the video-based location 44 from the cameras 50A-B to determine the locations of participants, to determine the framing for the views, and to steer the people-view camera 50B at the participants.

The wide view from the room-view camera 50A can give context to the people-view camera 50B and can be used so that participants at the far-end do not see video from the people-view camera 50B as it moves toward a participant. In addition, the wide view can be displayed at the far-end when multiple participants at the near-end are speaking or when the people-view camera 50B is moving to direct at multiple speakers. Transitions between the two views from the cameras 50A-B can be faded and blended as desired to avoid sharp cut-a-ways when switching between camera views.

As the people-view camera 50B is moved toward the speaker, for example, the moving video from this camera 50B is preferably not transmitted to the far-end of the videoconference. Instead, the video from the room-view camera 50A is transmitted. Once the people-view camera 50B has properly framed the current speaker, however, the endpoint 10 switches between the video from the cameras 50A-B.

All the same, the endpoint 10 preferably does not simply switch automatically to capture views of speakers. Instead, camera changes are preferably timed. Too many camera switches over a period of time can be distracting to the conference participants. Accordingly, the endpoint 10 preferably tracks those speakers using their locations, their voice characteristics, their frequency of speaking, and the like. Then, when one speaker begins speaking, the endpoint 10 can quickly direct the people-view camera 50B at that frequent speaker, but the endpoint 10 can avoid or delay jumping to another speaker who may only be responding with short answers or comments.

Although the endpoint 10 preferably operates without user intervention, the endpoint 10 may allow for user intervention and control. Therefore, camera commands from either one or both of the far and near ends can be used to control the cameras 50A-B. For example, the participants can determine the best wide view to be displayed when no one is speaking. Meanwhile, dynamic camera commands can control the people-view camera 50B as the videoconference proceeds. In this way, the view provided by the people-view camera 50B may be controlled automatically by the endpoint 10.

Figure 1B:
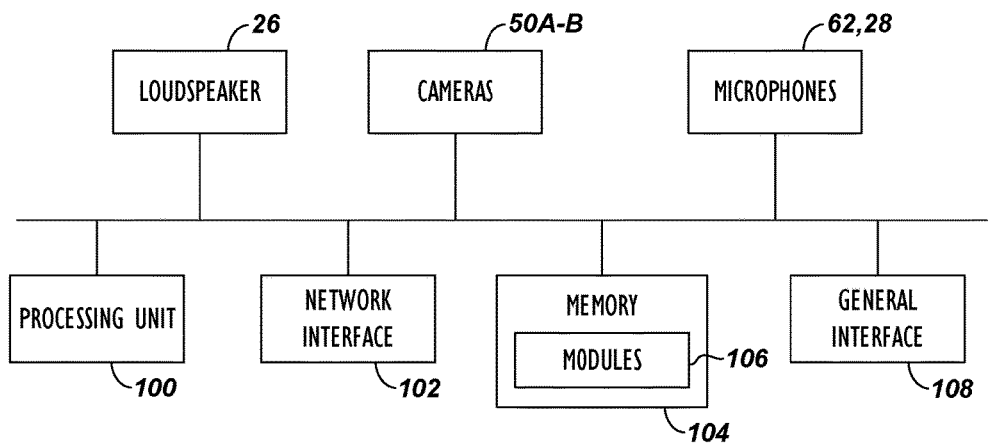
FIG. 1B illustrates components of the videoconferencing endpoint of FIG. 1A.

FIG. 1B shows some exemplary components for the videoconferencing endpoint 10 of FIG. 1A. As shown and discussed above, the endpoint 10 has two or more cameras 50A-B and several microphones 28/62A-B. In addition to these, the endpoint 10 has a processing unit 100, a network interface 102, memory 104, and a general input/output (I/O) interface 108 all coupled via a bus 101.

The memory 104 can be any conventional memory such as SDRAM and can store modules 106 in the form of software and firmware for controlling the endpoint 10. In addition to video and audio codecs and other modules discussed previously, the modules 106 can include operating systems, a graphical user interface (GUI) that enables users to control the endpoint 10, and algorithms for processing audio/video signals and controlling the cameras 50A-B as discussed later.

The network interface 102 provides communications between the endpoint 10 and remote endpoints (not shown). By contrast, the general I/O interface 108 provides data transmission with local devices such as a keyboard, mouse, printer, overhead projector, display, external loudspeakers, additional cameras, microphone pods, etc. The endpoint 10 can also contain an internal loudspeaker 26.

The cameras 50A-B and the microphone arrays 60A-B capture video and audio, respectively, in the videoconference environment and produce video and audio signals transmitted via the bus 101 to the processing unit 100. Here, the processing unit 100 processes the video and audio using algorithms in the modules 106. For example, the endpoint 10 processes the audio captured by the microphones 28/62A-B as well as the video captured by the cameras 50A-B to determine the location of participants and direct the views of the cameras 50A-B. Ultimately, the processed audio and video can be sent to local and remote devices coupled to interfaces 102/108.

In the plan view of FIG. 1C, one arrangement of the endpoint 10 uses a videoconferencing device 80 having microphone arrays 60A-B and two cameras 50A-B integrated therewith. A microphone pod 28 can be placed on a table, although other types of microphones, such as ceiling microphones, individual table microphones, and the like, can be used. The microphone pod 28 communicatively connects to the videoconferencing device 80 and captures audio for the videoconference. For its part, the device 80 can be incorporated into or mounted on a display and/or a videoconferencing unit (not shown).

FIG. 1D shows a plan view of another arrangement of the endpoint 10. Here, the endpoint 10 has several devices 80/81 mounted around the room and has a microphone pod 28 on a table. One main device 80 has microphone arrays 60A-B and two cameras 50A-B as before and can be incorporated into or mounted on a display and/or videoconferencing unit (not shown). The other devices 81 couple to the main device 80 and can be positioned on sides of the videoconferencing environment. As will be discussed in greater detail below, the main device 80 can be a master device and at least one of the other devices 81 can be a slave device controlled by the main device 80.

The auxiliary devices 81 at least have a people-view camera 50B, although they can have a room-view camera 50A, microphone arrays 60A-B, or both and can be the same as the main device 80. Either way, audio and video processing described herein can identify which people-view camera 50B has the best view of a speaker in the environment. Then, the best people-view camera 50B for the speaker can be selected from those around the room so that a frontal view (or the one closest to this view) can be used for conference video.

Before turning to operation of the endpoint 10 during a videoconference, discussion first turns to details of a videoconferencing device according to the present disclosure. As shown in FIG. 2A, a videoconferencing device 80 has a housing with a horizontal array 60A of microphones 62A disposed thereon. Extending from this housing, a vertical array 60B also has several microphones 62B. As shown, these arrays 60A-B can each have three microphones 62A-B, although either array 60A-B can have a different number than depicted.

The first camera 50A is the room-view camera intended to obtain wide or zoomed-out views of a videoconference environment. The second camera 50B is the people-view camera intended to obtain tight or zoomed-in views of videoconference participants. These two cameras 50A-B are mounted on the housing of the device 80 and can be integrated therewith. The room-view camera 50A has image processing components 52A that can include an actuator if not an EPTZ camera. The people-view camera 50B also has image processing components 52B that include an actuator to control the pan-tilt-zoom of the camera's operation. These components 52A-B can be operatively coupled to a local control unit 90 housed in the device 80.

For its part, the control unit 90 can include all or part of the necessary components for conducing a videoconference, including audio and video modules, network module, camera control module, etc. Alternatively, all or some of the necessary videoconferencing components may be housed in a separate videoconferencing unit 95 coupled to the device 80. As such, the device 80 may be a stand-alone unit having the cameras 50A-B, the microphone arrays 60A-B, and other related components, while the videoconferencing unit 95 handles all of the videoconferencing functions. Of course, the device 80 and the unit 95 can be combined into one unit if desired.

Rather than having two or more integrated cameras 50A-B as in FIG. 2A, the disclosed device 80 as shown in FIG. 2B can have one integrated camera 53. Alternatively as shown in FIGS. 2C-2D, the device 80 can include a base unit 85 having the microphone arrays 60A-B, communication ports (not shown), and other processing components (not shown). Two or more separate camera units 55A-B can connect onto the base unit 85 to make the device 80 (FIG. 2C), or one separate camera unit 55 can be connected thereon (FIG. 2D). Accordingly, the base unit 85 can hold the microphone arrays 60A-B and all other required electronic and signal processing components and can support the one or more camera units 55 using an appropriate form of attachment.

Although the device 80 has been shown having two cameras 50A-B situated adjacent to one another, either one or both of the cameras 50A-B can be entirely separate from the device 80 and connected to an input of the housing. In addition, the device 80 can be configured to support additional cameras instead of just two. In this way, users could install other cameras, which can be wirelessly connected to the device 80 and positioned around a room, so that the device 80 can always select the best view for a speaker.

Figure 3:
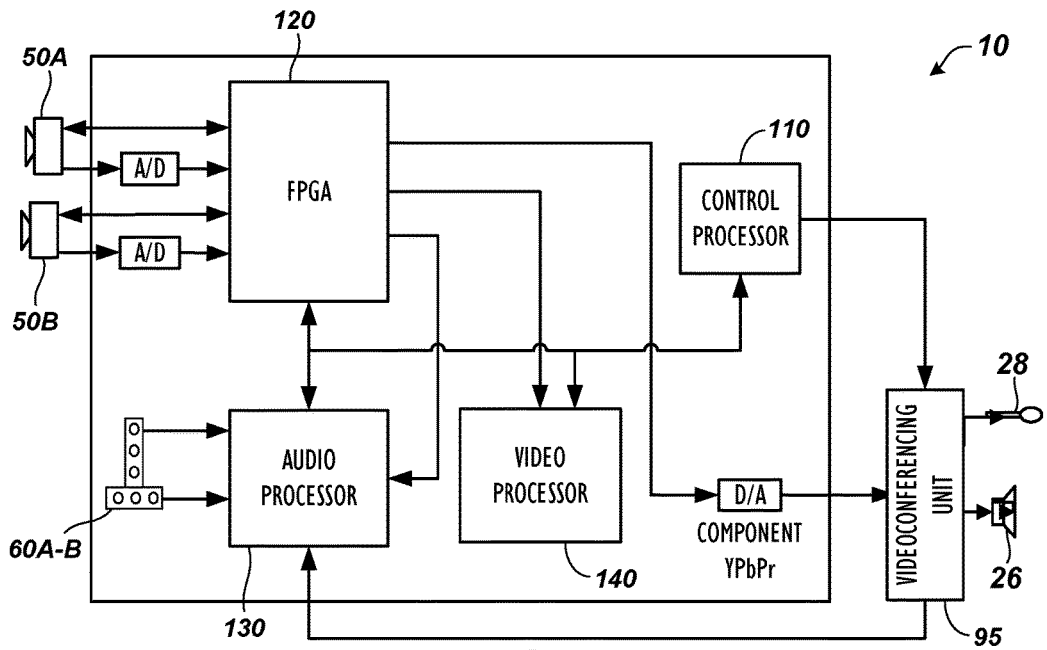
FIG. 3 illustrates components of the videoconferencing device of FIGS. 2A-2D.

FIG. 3 briefly shows some exemplary components that can be part of the device 80 of FIGS. 2A-2D. As shown, the device 80 includes the microphone arrays 60A-B, a control processor 110, a Field Programmable Gate Array (FPGA) 120, an audio processor 130, and a video processor 140. As noted previously, the device 80 can be an integrated unit having the two or more cameras 50A-B integrated therewith (See FIG. 2A), or these cameras 50A-B can be separate units having their own components and connecting to the device's base unit (See FIG. 2C). In addition, the device 80 can have one integrated camera (53; FIG. 2B) or one separate camera (55; FIG. 2D).

During operation, the FPGA 120 captures video inputs from the cameras 50A-B, generates output video for the videoconferencing unit 95, and sends the input video to the video processor 140. The FPGA 120 can also scale and composite video and graphics overlays. The audio processor 130, which can be a Digital Signal Processor, captures audio from the microphone arrays 60A-B and performs audio processing, including echo cancellation, audio filtering, and source tracking. The audio processor 130 also handles rules for switching between camera views, for detecting conversational patterns, and other purposes disclosed herein.

The video processor 140, which can also be a Digital Signal Processor (DSP), captures video from the FPGA 120 and handles motion detection, face detection, and other video processing to assist in tracking speakers. As described in more detail below, for example, the video processor 140 can perform a motion detection algorithm on video captured from the people-view camera 50B to check for motion in the current view of a candidate speaker location found by a speaker tracking algorithm. This can avoid directing the camera 50B at reflections from walls, tables, or the like. In addition, the video processor 140 can use a face-finding algorithm to further increase the tracking accuracy by confirming that a candidate speaker location does indeed frame a view having a human face.

The control processor 110, which can be a general-purpose processor (GPP), handles communication with the videoconferencing unit 95 and handles camera control and overall system control of the device 80. For example, the control processor 110 controls the pan-tilt-zoom communication for the cameras' components and controls the camera switching by the FPGA 120.

Figure 4:
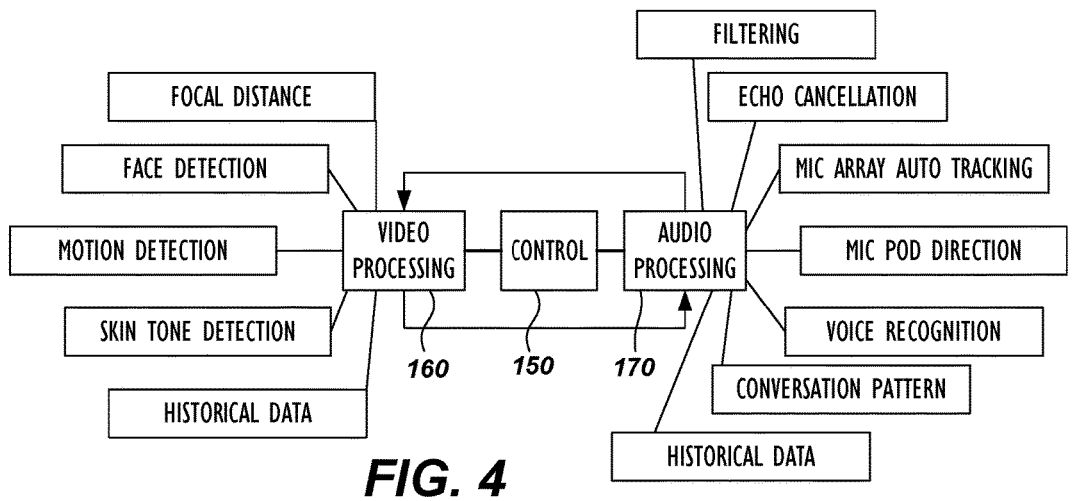
FIG. 4 illustrates a control scheme for the disclosed endpoint using both audio and video processing.

With an understanding of the videoconferencing endpoint and components described above, discussion now turns to operation of the disclosed endpoint 10. First, FIG. 4A shows a control scheme 150 used by the disclosed endpoint 10 to conduct a videoconference. As intimated previously, the control scheme 150 uses both video processing 160 and audio processing 170 to control operation of the cameras 50A-B during the videoconference. The processing 160 and 170 can be done individually or combined together to enhance operation of the endpoint 10. Although briefly described below, several of the various techniques for audio and video processing 160 and 170 are discussed in more detail later.

Briefly, the video processing 160 can use focal distance from the cameras 50A-B to determine distances to participants and can use video-based techniques based on color, motion, and facial recognition to track participants. As shown, the video processing 160 can, therefore, use motion detection, skin tone detection, face detection, and other algorithms to process the video and control operation of the cameras 50A-B. Historical data of recorded information obtained during the videoconference can also be used in the video processing 160.

For its part, the audio processing 170 uses speech tracking with the microphone arrays 60A-B. To improve tracking accuracy, the audio processing 170 can use a number of filtering operations known in the art. For example, the audio processing 170 preferably performs echo cancellation when performing speech tracking so that coupled sound from the endpoint's loudspeaker is not be picked up as if it is a dominant speaker. The audio processing 170 also uses filtering to eliminate non-voice audio from voice tracking and to ignore louder audio that may be from a reflection.

The audio processing 170 can use processing from additional audio cues, such as using a tabletop microphone element or pod (28; FIG. 1). For example, the audio processing 170 can perform voice recognition to identify voices of speakers and can determine conversation patterns in the speech during the videoconference. In another example, the audio processing 170 can obtain direction (i.e., pan) of a source from a separate microphone pod (28) and combine this with location information obtained with the microphone arrays 60A-B. Because the microphone pod (28) can have several microphones positioned in different directions, the position of an audio source relative to those directions can be determined.

When a participant initially speaks, the microphone pod (28) can obtain the direction of the participant relative to the microphone pod (28). This can be mapped to the participant's location obtained with the arrays (60A-B) in a mapping table or the like. At some later time, only the microphone pod (28) may detect a current speaker so that only its directional information is obtained. However, based on the mapping table, the endpoint 10 can locate the current speaker's location (pan, tilt, zoom coordinates) for framing the speaker with the camera using the mapped information.

As noted above however, in the multi-view environment, it is not sufficient to locate an active talker 51 and automatically point an adjustable camera in his direction. With the added power that comes from having multiple adjustable (and/or tracking) cameras comes also some new problems. Consider for example the situation in which a presenter is speaking and he is being tracked by two cameras; each of these cameras will capture an image of the speaker. One of the two cameras will provide an image that is superior to the other. While there are various factors that could make one view better than another, such as size, image quality, accuracy in voice to video synchronization, the property with which this disclosure is primarily concerned is which view more closely approximates a view in which the speaker is perceived as looking into or at the camera in question. By selecting the superior view for inclusion in the audio video transmission to a far endpoint, the visual experience—and hence the learning experience—of those at the receiving endpoint will be improved.

Thus, embodiments of this disclosure are directed toward determining which device (or camera) among the daisy-chained units provides the best zoomed-in, frontal view of the talker 51 as the system output. Methods used to make this determination include "head orientation estimation," which is the evaluation of image data to estimate in which direction a person's face is pointed. While finding a talker's 51 location, such as by using beamforming, which is a problem that is relatively easy to solve, determining the orientation the located talker 51's head/face is more challenging.

Head orientation estimation using standard face detection techniques to detect the front and side(s) of the face are insufficient. For example, a face detector is generally unable to determine which view of a face from amongst a plurality of views to use for head orientation estimation, if there is more than one face in the view facing different directions. This can happen when two people sit close to each other, such as when a meeting location contains many people who are close to one another.

Figure 5A:
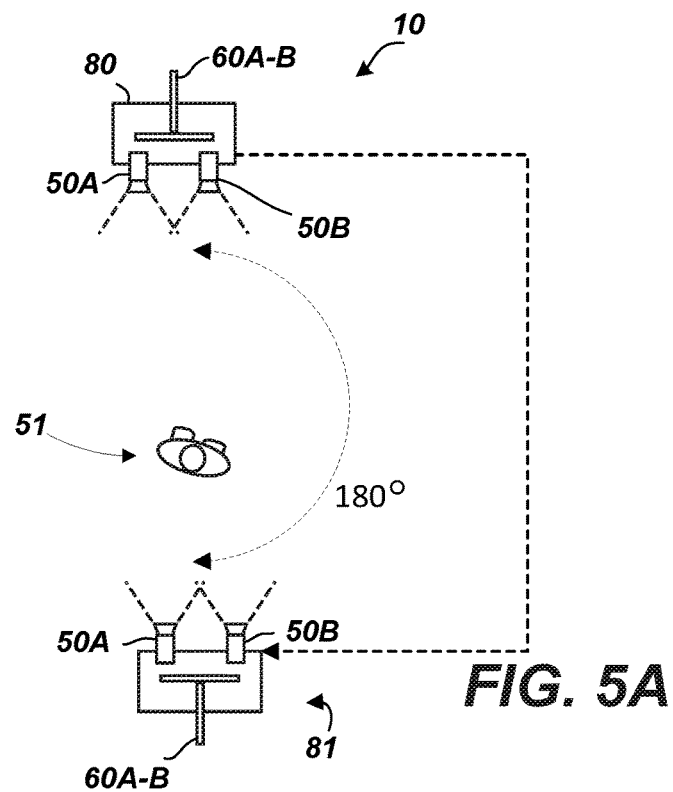
FIG. 5A-5B illustrate an endpoint configuration in accordance with this disclosure.
Figure 5B:
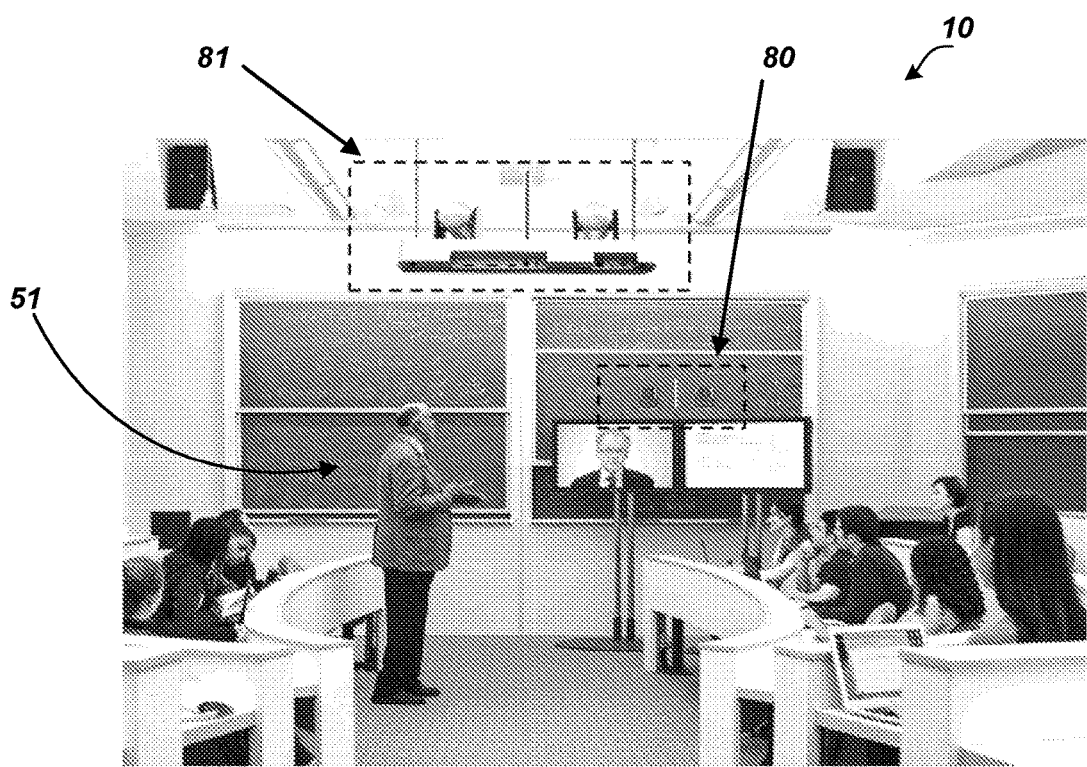

Furthermore, in some cases where there can be sound reflected off surfaces such as walls, as well as unwanted noises and interference sound. In such cases, the adjustable camera of the master device and the adjustable camera of the slave device might zoom in on different faces. For example, a reflected sound might be picked up by a one device, while there is the face of a person who is not speaking at that location. It would be disadvantageous if the view of the non-talker 51 were included in the audio-video stream, while a view of a meeting presenter is not picked. Again, there is greater likelihood of this type of confusion when a meeting place at an input is densely packed with people. Consider, the example of a large classroom with many students illustrated in FIGS. 5A and 5B, in which slave device 80 is used to extend the effective range of master device 80.

Another issue with relying on a face detector is that the resolution may be insufficient to determine the angle of the face relative to the camera tracking it. Most conventional face detectors cannot tell reliably between an image of talker who faces away from the camera by thirty (30) degrees and one who is turned ninety (90) degrees. In conventional face detection schemes, both such views would simply be detected as corresponding to the side of a face.

Figure 6A:
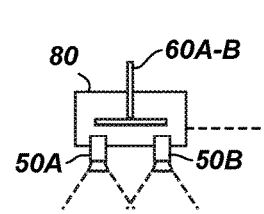
FIGS. 6A-6B illustrate another endpoint configuration in accordance with this disclosure.
Figure 6A:
Figure 6A:
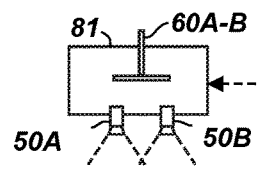
Figure 6B:
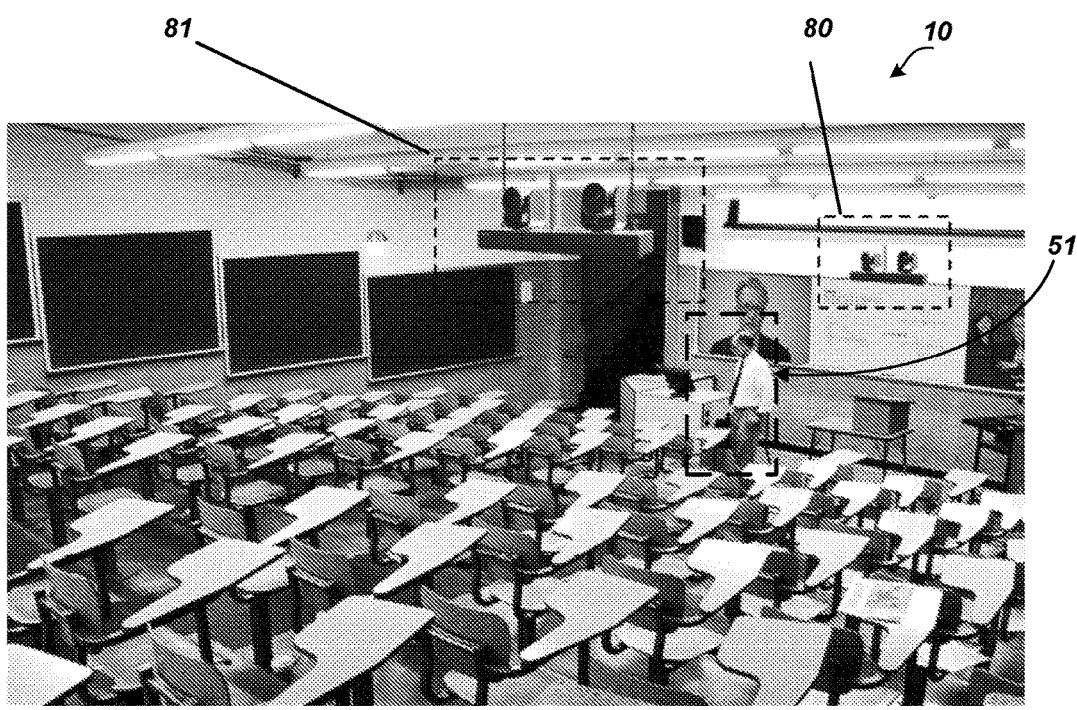

FIGS. 6A and 6B illustrate an endpoint in which a slave device is used to extend the range of a master device. Without proper face orientation estimation, both devices might detect the face of a talker as a frontal view if the talker is at the end of the classroom distal from the devices. However, one or more cues can be used to help ensure that camera view from the extension unit (slave device) is selected consistently, otherwise the zoomed-in talker view might frequently switch between the views captured by the slave device and the master device, which would be at least unpleasant, and perhaps disorienting to a viewer at a remote location receiving the audio-visual from the endpoint. A similar issue can arise in the layout shown in FIGS. 7A and 7B. As the professor 51 speaks from his chair, the view captured by master device 80 would most likely be optimal, whereas if the professor moved around the room, or drew on the black board and turned to face his class intermittently, the optimal—most face on—view is preferred, but switching between views too often in a given space of time would not be desirable.

In accordance with at least one embodiment, video information captured by the devices is supplemented with audio information. As discussed, locating and tracking an active talker 51 often uses multiple microphone arrays arranged at an endpoint. In such arrangement, the microphones at the endpoint must be carefully synchronized with regard to timing in audio pickup and analysis. One such system is set forth in U.S. Pat. No. 9,030,520, which is fully incorporated by reference herein. However, the techniques described in that patent are insufficient to handle the face orientation estimation needed to determine which camera view to select from amongst multiple camera views in the multi-device (at least one master and at least one slave) embodiments discussed herein. At least one embodiment of this disclosure is a multi-adjustable camera endpoint in which does not require the strict microphone signal time-synchronization of audio sampling as is conventionally required. For example, even signals which are out or sync by as much as 100 milliseconds are not problematic. This can obviate the need for the significant engineering efforts, which involves hardware, software, or a combination of both, which are generally required for proper synchronization. See the IEEE 1588 precision time protocol, for example.

In accordance with at least one embodiment, an endpoint 10 can detect head orientation at a much finer angle of resolution than has previously been possible. The greater acuity enabled by embodiments of this disclosure makes it possible to support daisy chained devices in various configurations, including those illustrated in FIGS. 5-7.

In accordance with at least one embodiment, in addition to the 1st order information pertaining to a talker's location (pan, tilt, depth), 2nd order information is derived from the data picked up by the microphone array. The derivation can be achieved by using one or more algorithms configured for this purpose. In at least one embodiment, the microphone array is used to estimate the direct-reverberant ratio (DRR) of the speech coming from an active talker. In at least one embodiment, the DRR detected from by a microphone (array) diametrically opposed to the front of the speaking person's mouth (i.e., face) is greater than the DRR which is detected by an array at an angle to the front of the speaker's mouth, even in cases where the speaker is physically closer to the angled microphone (array).

Figure 8A:
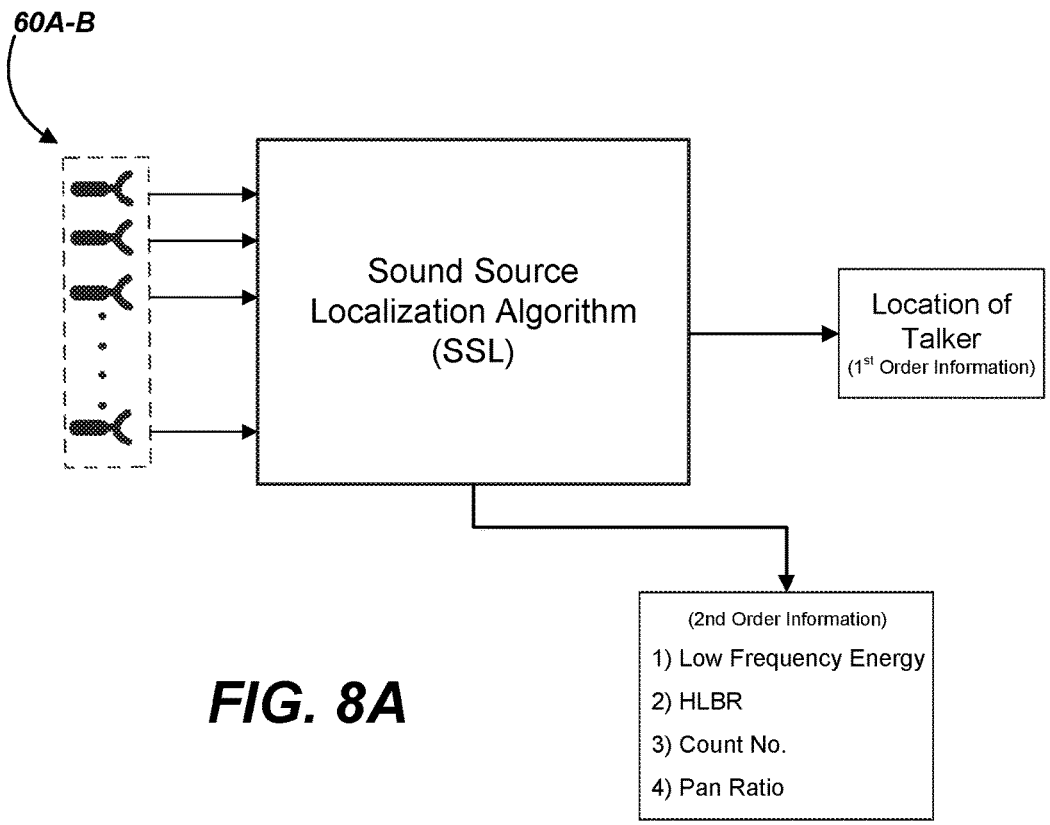
FIG. 8A is a block diagram of a sound source location algorithm in accordance with an embodiment of this disclosure.

FIG. 8A illustrates a block diagram of a specialized sound source localization (SSL) algorithm for a device 80, 81. In addition to the standard 1st order information consisting of pan, tilt, and depth used to locate a speaker 51, four 2nd order parameters are also produced by the SSL. In accordance with at least one embodiment of this disclosure, a second-order-information score (SOIC) for each of the master device and slave device is determined. The SOIC for a device 80, 81 corresponds to the weighted sum of the four parameters.

The first parameter from the SSL is pan-ratio, which reflects DRR. Pan-ratio (PR) is determined by calculating the ratio of the peak signal to the average signal in the (beamforming) steered response power plot. When a talker turns their head, DRR changes, and consequently pan-ratio also changes. The inventors have determined that pan-ratio is lowest when a talker turns faces away from the device. This is the case because in this facing reverberation of the speaker's voice is maximal and the DRR is minimal. FIG. 9A and FIG. 9B shows two examples: facing (a strong peak leading to a high pan-ratio) vs turning back (a weak peak leading to a low pan-ratio). Hence, pan-ratio is an indicator of head orientation. In the voting scheme, pan-ratio is weighted by a factor of two.

The second parameter from SSL is called number-of-counts. Number-of-counts (NC) is the number of times that the SSL was able to determine the source of the sound in question within the last two seconds (other predetermined periods are also possible, though two seconds has been determined to be highly effective). The number-of-counts is an indicator of the sensitivity (and thus accuracy) with which the talker's location is being evaluated. In accordance with at least one embodiment, the SSL core routine runs every twenty milliseconds. In some embodiments, the SSL relies heavily on the high frequencies. When the talker faces the device, more high-frequencies are beamed to the microphone array, and it becomes easier for the SSL algorithm detect and track the talker's location. On the other hand, it is more difficult for the SSL algorithm to detect and track the talker's location when the talker's head faces away. In at least one version of the scheme described, number-of-counts is also weighed by a factor of two, (though this could be modified depending on the needs of a particular environment/configuration.)

The third parameter from the SSL is the ratio of high-band energy signals to low-band energy signals (HBLD) detected by the array microphones. The directivity of lower frequency radiation is less than that of higher frequency radiation. In accordance with at least one embodiment, HBLD is weighted by a factor of one.

The fourth parameter is called 'low frequency energy' (LFE). LFE acts as a verifier to cover some rare cases. For example, when a talker sits very close to a first camera device, but faces a very distant second camera device. The nearby first device might pick up the sound reflected off a monitor display which sits the second device. In the absence of LFE, the view captured by the first device (due to the TV display reflection) might be mistakenly chosen for inclusion in the audio-visual feed sent to a remote location. LFE can be used to avoid error such cases. In this example, the LFE of the first device would be greater than that of the second device, which would indicate the speaker is much closer to the first device than to the second. If a disparity between the LFE of the first device and the LFE of the second device exceeds a predefined threshold, an alternate method of determining the SOIC for the devices is used. When calculating the alternate SOIC (SOIC2), weighted versions of pan-ratio and number-of-counts are used, wherein weighted-pan-ratio is defined as the pan-ratio divided by the square root of LFE, and weighted-number-of-counts is the number-of-counts divided by the same. In at least one embodiment, the LFE disparity threshold is a two to one ratio between the LFE of one device with the LFE of the other. That is, if either LFE is more than twice the magnitude of the other, SOICver2 is utilized, rather than SOIC.

As noted above a second-order-information score (SOIC) for each of the master device and slave device is determined. The SOIC for a device corresponds to the weighted sum of the four parameters, (SOIC=2*PR+2*NC+HBLD), or if the disparity of LFEs is high, a second SOIC is used, wherein SOICver2=[2*PR/sqrt(LFE)]+[2*NC/sqrt(LFE)]+HBLD.

Figure 8B:
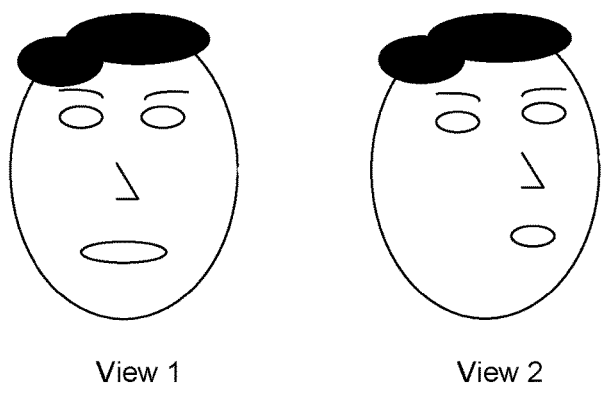
FIG. 8B illustrates use of the comparative results of the sound source location algorithm of FIG. 8A to determine an optimal view in accordance with an embodiment of this disclosure.
Figure 10:
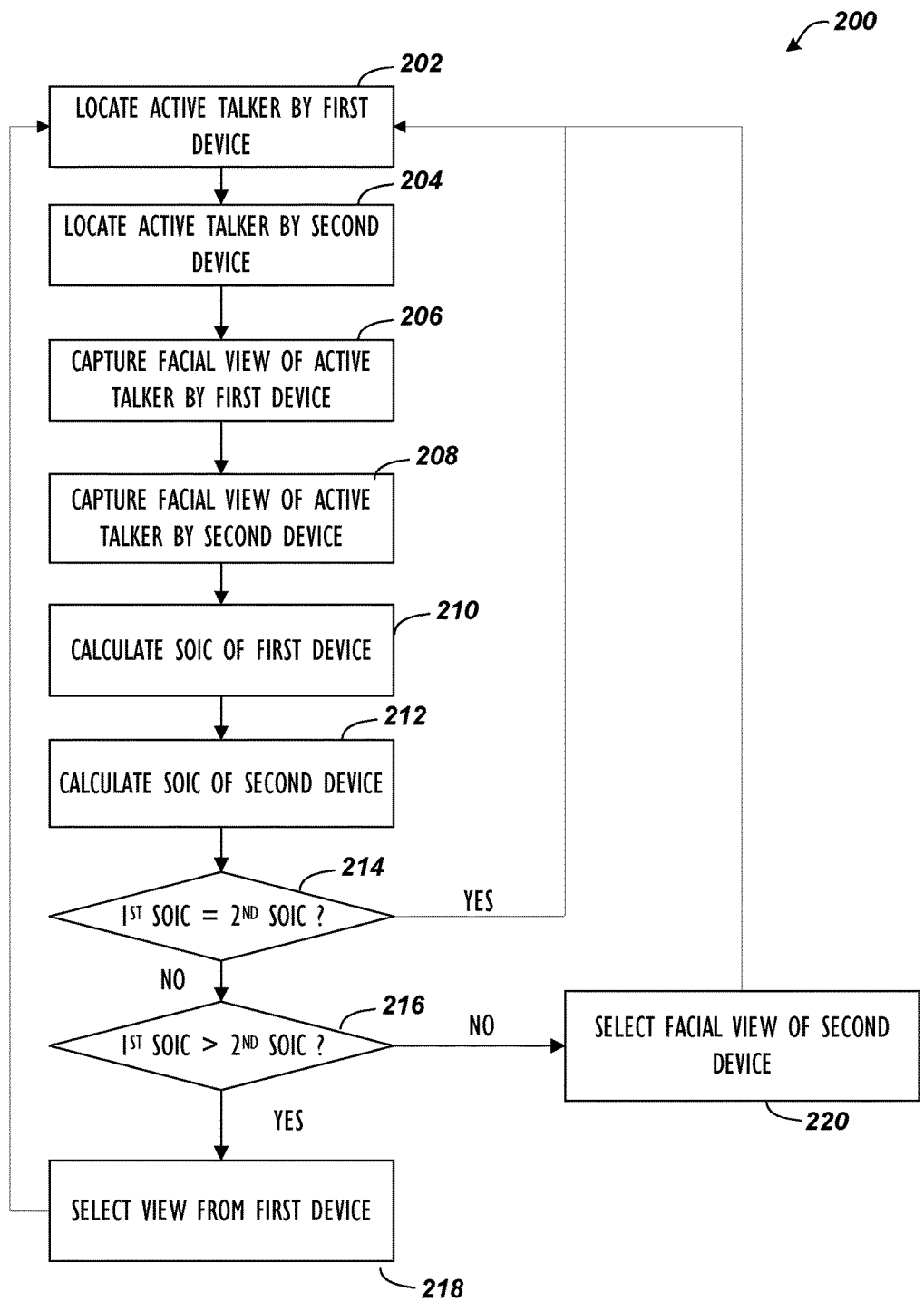
FIG. 10 illustrates a method for determining an optimal face view from amongst a plurality of views, in accordance with an embodiment of this disclosure.

Each device will have a SOIC for its captured view, (see FIG. 10). As shown in FIG. 8B, if one (e.g., slave) device captures view 1, and another (e.g., master) device captures view 2, the SOIC detected at the slave device will exceed that of the master device, and hence view 1 will be used. FIG. 10 illustrates an example method 200 for producing such a result. An active talker is located 202 using first order SSL information captured by a first (e.g., slave) device 81. The active talker 51 is also located 202 using first order SSL information captured by a second (e.g., master) device 80. Both devices 80, 81 capture facial views 206, 208. The SOIC associated with each of these views is calculated 210, 212 using the algorithm set forth above. If the two views have the same (or very nearly the same) SOIC, the endpoint 10 can determine that a selection is not possible, and start again at 202. Alternatively, other data could be used to make a selection, or one could be selected by default. If the SOIC of the first device is greater 216 than that of the second device, the view from the first device will be selected 218 for inclusion in the audio-video feed. Otherwise, the view from the second device will be selected 220.

Figure 11:
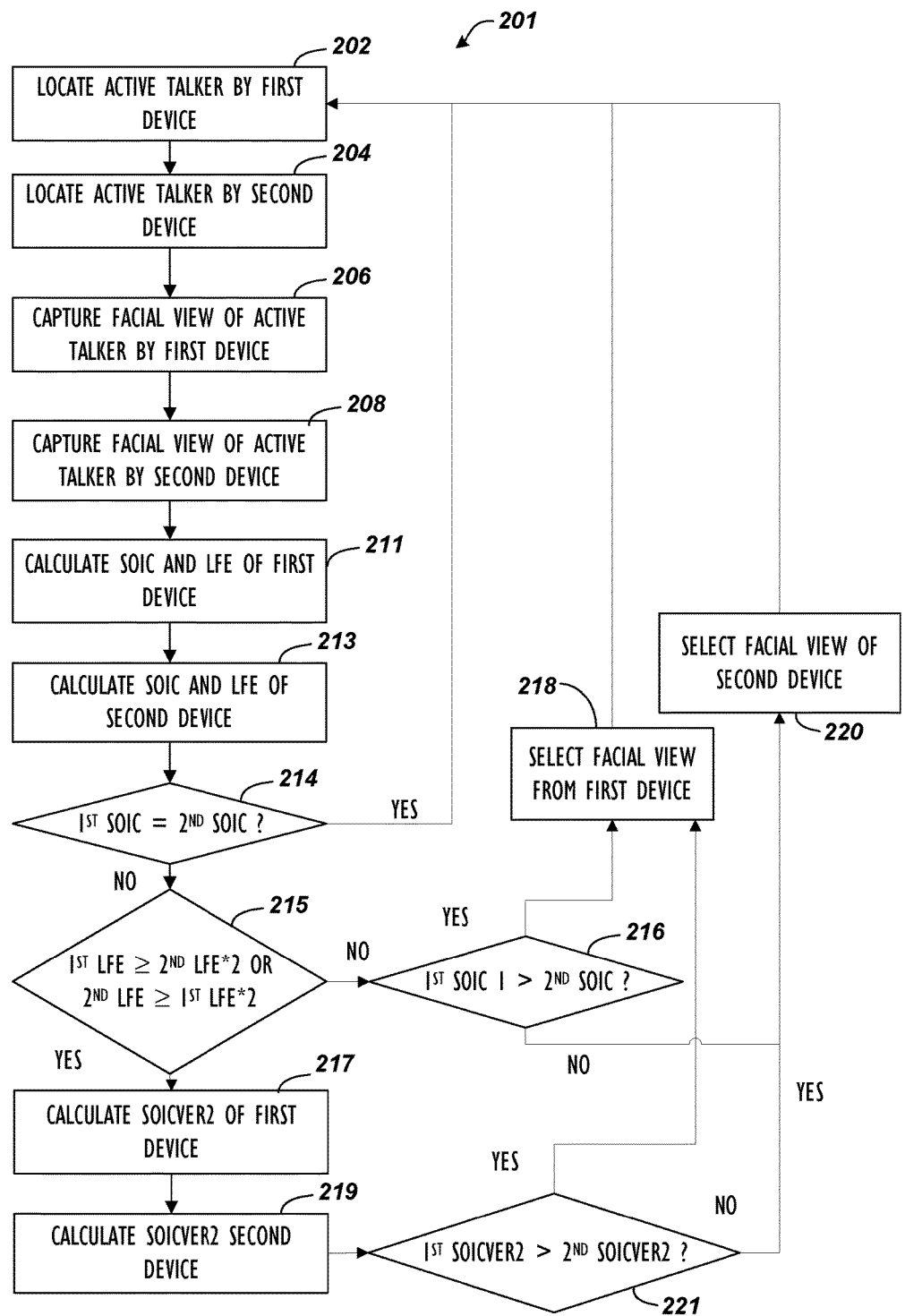
FIG. 11 illustrates another method for determining an optimal face view from amongst a plurality of views, in accordance with an embodiment of this disclosure.

FIG. 11 illustrates a second example method 201 for determining which facial view is optimal. It is the same as method 200 with some exceptions, as described below. As before, an active talker is located 202 using first order SSL information captured by a first (e.g., slave) device 81. The active talker 51 is also located 202 using first order SSL information captured by a second (e.g., master) device 80. Both devices 80, 81 capture facial views 206, 208. The SOIC associated with each of these views is calculated using the algorithm set forth above, and the LFE corresponding to each of these views is also determined 211, 213. If the two views have the same (or very nearly the same) SOIC, the endpoint 10 can determine that a selection is not possible, and start again at 202. Alternatively, other data could be used to make a selection, or one could be selected by default. If the SOIC of the two devices are not the same, the method 201 proceeds to step 215 where a determination is made as to whether the disparity between the LFE of the first device and the LFE exceeds a threshold (e.g., a 2:1 ratio), the LFE affected SOICver2 is determined 217, 219 for each device. If the SOICver2 of the first device is greater 221 than that of the second device, the view from the first device will be selected 218 for inclusion in the audio-video feed. Otherwise, the view from the second device will be selected 220.

One or more acts in accordance with flow chart steps or process steps may be performed by a programmable control device executing instructions organized into one or more program modules on a non-transitory programmable storage device. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Non-transitory programmable storage devices, sometimes called a computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Embodiments within this disclosure can include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein.

The particular sequence of such executable instructions or associated data structures represents examples of corresponding acts for implementing the functions described in such steps.

Embodiments of the disclosure may be practiced in network computing environments with many types of computer system configurations, including personal computers, handheld devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only, and should not be construed so as to limit the scope of the disclosure. Various modifications and changes can be made to the principles and embodiments described herein without departing from the scope of the disclosure and without departing from the claims which follow. Any element in a claim that does not explicitly state "means for" performing a specified function, or "step for" performing a specific function, is not to be interpreted as a "means" or "step" clause as specified in 35 U.S.C § 112, sixth paragraph.

The invention claimed is:

1. A method for determining an optimal camera view from amongst a plurality of views, the method comprising:
    ascertaining an active talker using a first sound location module, capturing a first view of the active talker using a first camera unit, and deriving a first set of second-order information corresponding to the first view;
    ascertaining the active talker using a second sound location module, capturing a second view of the active talker using a second camera, and deriving a second set of second-order information corresponding to the second view;
    detecting low-frequency energy (LFE) corresponding to the first and second views;
    determining that the LFE corresponding to the first view differs from the LFE corresponding to the second view in excess of a predetermined value;
    including, based on the determination, the LFE corresponding to the first view within the first set of second-order information, and the LFE corresponding to the second view within the second set of second-order information;
    determining an optimal view from amongst the first and second views based, at least in part, on the first set of second-order information and the second set of second-order information; and
    including the optimal view in a video stream.

2. The method of claim 1, wherein including the optimal view in the video stream comprises switching a current view in the video stream to the optimal view.

3. The method of claim 1, wherein the first sound location module is different from the second sound location module.

4. The method of claim 1, wherein the first set of second-order information includes first pan-ratio information, and the second set of second-order information includes second pan-ratio information.

5. The method of claim 1, wherein the first set of second-order information includes first number-of-counts (NC) information and the second set of second-order information includes second number-of-counts information.

6. The method of claim 1, wherein the first sound location module is coupled to a first microphone array, and the second sound location module is coupled to a second microphone array.

7. The method of claim 6, wherein the first microphone array is different from the second microphone array.

8. A non-transitory computer readable medium storing instructions executable by one or more processors, the instructions comprising instructions to:
    ascertain an active talker using a first sound location module, capture a first view of the active talker using a first camera unit, and derive a first set of second-order information corresponding to the first view;
    ascertain the active taker using a second sound location module, capturing a second view of the active taker using a second camera, and derive a second set of second-order information corresponding to the second view;
    detect low-frequency energy (LFE) corresponding to the first and second views;
    determine that the LFE corresponding to the first view differs from the LFE corresponding to the second view in excess of a predetermined value;
    include, based on the determination, the LFE corresponding to the first view within the first set of second-order information, and the LFE corresponding to the second view within the second set of second-order information;
    determine an optimal view from amongst the first and second views based, at least in part, on the first set of second-order information and the second set of second-order information; and
    include the optimal view in a video stream.

9. The non-transitory computer readable medium of claim 8, wherein the instructions to include the optimal view in a video stream comprise instructions to replace a current view in the video stream with the optimal view.

10. The non-transitory computer readable medium of claim 9, wherein the instructions to include the optimal view in a video stream comprise instructions to determine that the current view has been included in the video stream for a time period which exceeds a predetermined threshold.

11. The non-transitory computer readable medium of claim 8, wherein the first sound location module is different from the second sound location module.

12. The non-transitory computer readable medium of claim 8, wherein the first set of second-order information includes first pan-ratio information, and the second set of second-order information includes second pan-ratio information.

13. The non-transitory computer readable medium of claim 8, wherein the first set of second-order information includes first number-of-counts information and the second set of second-order information includes second number-of-counts information.

14. The non-transitory computer readable medium of claim 9, wherein the first sound location module is coupled to a first microphone array, and the second sound location module is coupled to a second microphone array.

15. The non-transitory computer readable medium of claim 14, wherein the first microphone array is different from the second microphone array.

16. A teleconferencing endpoint comprising:
one or more processors;
a first camera unit and a first microphone array, the first camera unit and the first microphone array coupled to the one or more processors;
a second camera unit and second microphone array, the second camera unit and the second microphone array coupled to the one or more processors; and
a non-transitory computer readable medium storing instructions executable by the one or more processors, the instructions comprising instructions to:
capture first audio using the first microphone array, ascertain an active talker using a first sound location module based on the first audio, capture a first view of the active talker using the first camera unit, and derive a first set of second-order information corresponding to the first view;
capture second audio using the second microphone array, ascertain the active talker using a second sound location module based on second audio, capture a second view of the active talker using the second camera unit, and derive a second set of second-order information corresponding to the second view;
detect low-frequency energy (LFE) corresponding to the first audio and the second audio;
determine that the LFE corresponding to the first audio differs from the LFE corresponding to the second audio in excess of a predetermined value;
include, based on the determination, the LFE corresponding to the first audio within the first set of second-order information, and the LFE corresponding to the second audio within the second set of second-order information;
determine an optimal view from amongst the first and second views based, at least in part, on the first set of second-order information and the second set of second-order information; and
include the optimal view in a video stream.

17. The teleconferencing endpoint of claim 16, wherein the instructions to include the optimal view in a video stream comprise instructions to replace a current view in the video stream with the optimal view.

18. The teleconferencing endpoint of claim 16, wherein the first sound location module is different from the second sound location module.

19. The teleconferencing endpoint of claim 16, wherein the first set of second-order information includes first pan-ratio information, and the second set of second-order information includes second pan-ratio information.

20. The teleconferencing endpoint of claim 16, wherein the first set of second-order information includes first number-of-counts information and the second set of second-order information includes second number-of-counts information.

* * * * *